(12) United States Patent
Ichikawa et al.

(10) Patent No.: US 11,780,258 B2
(45) Date of Patent: Oct. 10, 2023

(54) LIQUID STORAGE MEMBER FOR COATING TOOLS

(71) Applicant: MITSUBISHI PENCIL COMPANY, LIMITED, Tokyo (JP)

(72) Inventors: Shuji Ichikawa, Tokyo (JP); Shinobu Kajiyama, Tokyo (JP); Takeshi Iimori, Tokyo (JP); Takayuki Yamaguchi, Osaka (JP)

(73) Assignee: MITSUBISHI PENCIL COMPANY, LIMITED, Tokyo (JP)

( * ) Notice: Subject to any disclaimer, the term of this patent is extended or adjusted under 35 U.S.C. 154(b) by 30 days.

(21) Appl. No.: 17/624,091

(22) PCT Filed: Apr. 10, 2020

(86) PCT No.: PCT/JP2020/016082
§ 371 (c)(1),
(2) Date: Dec. 30, 2021

(87) PCT Pub. No.: WO2021/014698
PCT Pub. Date: Jan. 28, 2021

(65) Prior Publication Data
US 2022/0355612 A1    Nov. 10, 2022

(30) Foreign Application Priority Data

Jul. 19, 2019  (JP) .................. 2019-133483

(51) Int. Cl.
*B43K 7/02* (2006.01)
*B43K 5/02* (2006.01)
(Continued)

(52) U.S. Cl.
CPC .................. *B43K 7/02* (2013.01); *B43K 5/02* (2013.01); *B43K 8/03* (2013.01); *B43K 8/146* (2013.01); *B43K 8/165* (2013.01)

(58) Field of Classification Search
CPC ... B43K 5/02; B43K 7/02; B43K 7/08; B43K 8/03; B43K 8/146; B43K 8/165
See application file for complete search history.

(56) References Cited

U.S. PATENT DOCUMENTS 1,396,060 A  *  11/1921  Richter .................. B31B 50/00
                                                       138/146
5,399,041 A  *   3/1995  Chiswell .............. B43K 19/145
                                                       401/241
(Continued)

FOREIGN PATENT DOCUMENTS

CN    108189588 A    6/2018
JP    S62-9997 A     1/1987
(Continued)

OTHER PUBLICATIONS

International Search Report dated Jun. 9, 2020, issued in counterpart International Application No. PCT/JP2020/016082. (2 pages).
(Continued)

*Primary Examiner* — David P Angwin
*Assistant Examiner* — Bradley S Oliver
(74) *Attorney, Agent, or Firm* — WHDA, LLP

(57) ABSTRACT

Provided is a liquid storage member for coating tools which successfully reduces plastic consumption and reduces environmental loads, by making use of materials based on paper in place of plastics such as polypropylene that has been used for liquid (e.g., ink) storage members. A liquid storage member for coating tools having at least three layers of a paper base laminate composed of an inner layer made of paper base material, and a middle layer of a metal layer or a silica deposition layer, formed on the outer peripheral side of the inner layer; and an outer layer made of the paper base material formed on the outer peripheral side of the middle (Continued)

layer, wherein the paper base material of the inner layer has a density of 0.8 g/cm³ or more.

7 Claims, 2 Drawing Sheets

(51) Int. Cl.
*B43K 8/03* (2006.01)
*B43K 8/14* (2006.01)
*B43K 8/16* (2006.01)

(56) References Cited

U.S. PATENT DOCUMENTS

| | | | | |
|---|---|---|---|---|
| 5,693,416 | A * | 12/1997 | Kucherovsky | B32B 27/10 428/34.3 |
| 10,532,545 | B2 * | 1/2020 | Fushimi | B32B 27/36 |
| 11,260,637 | B2 * | 3/2022 | Kuwajima | B32B 27/30 |
| 2004/0265041 | A1 | 12/2004 | Miyamoto et al. | |
| 2021/0177177 | A1 * | 6/2021 | Kawasaki | D21H 17/37 |
| 2022/0176728 | A1 * | 6/2022 | Ichikawa | B43K 8/03 |

FOREIGN PATENT DOCUMENTS

| | | |
|---|---|---|
| JP | 62-70097 A | 3/1987 |
| JP | H09-192582 A | 7/1997 |
| JP | 2001-146091 A | 5/2001 |
| JP | 3095119 U | 4/2003 |
| KR | 10-2004-0060889 A | 7/2004 |
| WO | 2004/028829 A1 | 4/2004 |

OTHER PUBLICATIONS

Office Action dated Feb. 10, 2023, issued in counterpart CN Application No. 202080052071.X. (8 pages).

Extended (Supplementary)European Search Report dated Jul. 18, 2023, issued in counterpart EP Application No. 20844032.1. (8 pages).

* cited by examiner

LIQUID STORAGE MEMBER FOR COATING TOOLS

TECHNICAL FIELD

The present invention relates to a liquid storage member for coating tools which reduces environmental loads by using paper base material instead of plastics.

BACKGROUND ART

An ink storage tube for writing tools such as ballpoint pens (hereinafter also referred to as a "refill") is put into a shaft pipe of the writing tool, where its one end (the front end) of the ink storage tube is press-fitted to a ballpoint pen tip or a relay member supporting the ballpoint pen tip which is a writing tool member.

Transparent or semitransparent plastics such as polypropylene have been used for such ink storage tubes for a long time to ensure easy shaping and visibility of the ink amount.

Recently, attention has been focused on the issue of microplastics flowing out in the ocean. Momentum for action on global environmental issues, such as refrainment from using single-use plastics, has been gained.

Proposals for plastic reduction have been also made concerning components of a writing tool. PTL 1 discloses a writing tool equipped with a shaft pipe manufactured in the way of spirally winding a laminated composite material made of barrier synthetic resins or metals such as aluminum, on paper base material.

In order to improve the water resistance and the gas barrier properties, the shaft pipe used for the writing tool has such a structure as follows: Aluminum foil label paper with kraft paper on the back, and the liner paper are layered as the outer side of the shaft pipe, and as the inner side of the shaft pipe, a polyethylene layer and thereon a polyester film with an aluminum vapor deposition film are layered.

The shaft pipe made of composite materials comprising the paper base materials can provide a writing tool with less pollution while keeping its content resistance and durability.

PTL 2 proposes a water-based ink storage member with an ink storage tube having multilayer structure where one or more layers of other resin layers are formed inside a storage tube base made of a biodegradable resin.

According to PTL 2, the storage tube base made of a biodegradable resin not only does not swell with a water-based ink and cause any dimensional change, but also biodegrades over time, which can thereby contribute to reducing the disposal amount of waste.

CITATION LIST

Patent Literature

PTL 1: JP S62-70097 A
PTL 2: JP 2001-146091 A

SUMMARY OF INVENTION

Technical Problem

As described above, products using biodegradable resins and paper base materials can lead to less pollution. Especially, it is assumed that environment-friendly products as alternative materials for plastics can be provided by using materials including pulp and paper as base materials.

Taking the viewpoint described above into consideration, the present invention has been carried out to reduce plastics by substituting the liquid (e.g., an ink) storage tubes made of plastics such as polypropylene with materials based on paper.

Solution to Problem

The liquid storage member for coating tools of the present invention has at least three layers of a paper base laminate composed of an inner layer made of paper base material, and a middle layer which is a metal layer or a silica deposition layer, formed on the outer peripheral side of the inner layer; and an outer layer made of the paper base material, wherein the paper base material of the inner layer has a density of 0.8 $g/cm^3$ or more.

The paper base material of the inner layer is preferably glassine paper, parchment paper, or vulcanized fiber.

It is preferable that the liquid storage member for coating tools have structures in which the paper base laminate is spirally wound, and the outer layer made of paper base material is spirally wound around the outer peripheral side of the middle layer.

It is preferable that along the lengthwise direction of the liquid storage member for coating tools, the paper base laminate is spirally arranged so that its adjacent portions come into contact but are not overlapped with each other, and the outer layer made of the paper base material is spirally arranged with its adjacent portions being in contact with each other.

The liquid storage member for coating tools preferably has two or more of the paper base laminates.

The contact portion between the paper base laminates and the contact portion between the outer layers made of the paper base material are preferably arranged apart from each other by 1 mm or more and a half or less of the width of the paper base laminate or the outer layer made of the paper base material along the lengthwise direction of the liquid storage member for coating tools.

The liquid storage member for coating tools is preferably a paper refill for a writing tool.

Advantageous Effects of Invention

The present invention can provide a liquid storage member for coating tools which successfully reduces plastic consumption and reduces environmental loads, by making use of paper base materials instead of plastics.

DESCRIPTION OF EMBODIMENTS

Figure 1A:
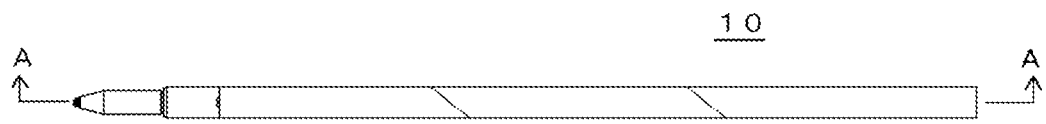
FIGS. 1A and 1B are a plane view and a sectional view along line A-A of a liquid storage member for coating tools of the present invention.

The liquid storage member for coating tools according to the present invention will be described in detail referring to the drawings.

An embodiment of the liquid storage member for coating tools of the present invention (hereinafter also referred to simply as a "liquid storage member") 10 has at least three layers: a paper base laminate composed of an inner layer 1 made of paper base material, and a middle layer 2 of a metal layer or a silica deposition layer, formed on the outer peripheral side of the inner layer 1; and an outer layer 3 made of paper base material formed on the outer peripheral side of the middle layer 2. The paper base material of the inner layer has a density of 0.8 g/cm³ or more.

The liquid storage member 10 has at least three layers of an inner layer 1 in contact with liquid, the middle layer 2, and the outer layer 3. Among the three layers, the inner layer 1 and the middle layer 2 constitute a paper base laminate, that is to say, a laminated composite material in which a metal layer or a silica deposition layer is formed on the surface of the paper base material. The paper base laminate is in the shape of band cut to a predetermined width, when being spirally wound around the mandrel in the process of manufacturing the liquid storage member 10.

The inner layer 1 is composed of paper base material with a density of 0.8 g/cm³ or more. The inner layer 1 material includes various known paper materials, such as fine quality paper, medium quality paper, glazed paper, kraft paper, machine-glazed kraft paper, bleached kraft paper, cardboard, white paper board, liner, fine coating paper, coated paper, art paper, cast-coated paper, glassine paper, parchment paper, and vulcanized fiber.

Among these, the paper base material having a density of 0.8 g/cm³ or more can give water resistance and oil resistance.

To be specific, a preferable example of the paper base material constituting the inner layer 1 is glassine paper, parchment paper, or vulcanized fiber.

Glassine paper, which is highly dense and transparent paper, is prepared by beating virgin pulp strongly to enlarge the specific surface area and supercalendering the paper made therefrom for densification and reinforcement of interfiber bonding of cellulose. The glassine paper with a basis weight of 20 to 50 g/m² is used in the present invention. Water resistance and oil resistance are easily imparted by using the glassine paper as paper base material constituting the inner layer 1. Coating liquids such as a polyvinyl alcohol aqueous solution may be applied to either one or both sides of glassine paper with a basis weight of 20 to 50 g/m² as a base paper. The glassine paper ordinarily has a thickness of 20 to 50 μm, and preferably 20 to 30 μm.

Parchment paper and vulcanized fiber are the products of direct interfiber bonding between cellulose reinforced by treatment with concentrated sulfuric acid and a solution of zinc chloride, that is, the products with increased density of hydrogen bonding between cellulose fibers. Therefore, the use of parchment paper and vulcanized fiber as the paper base material constituting the inner layer 1 can effectively prevent generation of paper dust.

For example, parchment paper with a basis weight of 20 to 100 g/m² may be used, and preferably, oil resistance may be enhanced for the parchment paper to have an oil absorbency of 13 g/m² or less in accordance with Testing Method for Water Absorptiveness of Paper and Paperboard (Cobb method) where mineral oil is used instead of water. The parchment paper usually has a thickness of 20 to 100 μm, and preferably 20 to 60 μm.

Vulcanized fiber can be thickened more easily than parchment paper due to the difference in reactivity in the manufacturing process. Therefore, the vulcanized fiber is appropriate when thicker paper base material is required. The vulcanized fiber is ordinarily 0.08 to 1 mm thick, and is preferably 0.1 to 0.5 mm thick, considering the compressive strength of the paper tube part after the formation of the liquid storage member 10 and easy handling during production thereof. The vulcanized fiber is denser than typical paper-tube base papers and the density is usually 0.8 to 1.4 g/cm³. In the present invention, 0.8 to 1.3 g/cm³ is favorable, considering the strength of the paper tube part and the availability.

Parchment paper and vulcanized fiber may be impregnated with resins or coated with glass. Such treatments make the bonding of cellulose fibers stronger, which can thereby suppress the generation of paper dust even though these papers are used as paper base material constituting the inner layer 1.

The inner layer 1 and the middle layer 2 in the liquid storage member 10 are made of the paper base laminate, using paper base material and a metal layer or a silica deposition layer of the same thickness, but each layer which has different thickness may be used in an appropriate combination.

The inner layer 1 and the middle layer 2, which constitute the liquid storage member 10, are formed as follows: A paper base laminate is cut to a width of approximately 4 to 70 mm with a bobbin slitter machine, etc. The paper base laminates of different thicknesses are wound around the outer side of a mandrel (a paper tube manufacturing machine) for manufacturing the liquid storage member 10 to make a few layers joined, while applying adhesives such as a vinyl acetate adhesive and an acrylic adhesive. Winding methods include a method of winding the paper base laminate spirally around the mandrel, i.e., "spiral winding" and a method of winding the paper base laminate at right angles to the mandrel, i.e., "flatwise winding". Of these two methods, the spiral winding is favorable from the viewpoint of the productivity. Besides, the mandrel should undergo a surface treatment with a lubricant in advance, so as to pull it out easily after the inner layer 1, the middle layer 2 and the outer layer 3 are formed; alternatively, a moderate amount of lubricant may be applied to the side of the inner layer 1 (paper base material) to be in contact with the mandrel.

As described above, the paper base laminate is a band-like sheet prepared by forming a metal layer or a silica deposition layer on paper base material. The metal layer may be prepared by adhering metal foils such as aluminum foil to one side of the paper base material with acrylic resin etc., or may be prepared by depositing aluminum, an alloy of aluminum and zinc, etc., on one side of the paper base material with electron beam under vacuum.

The thickness ratio of the paper base material to the metal layer or the silica deposition layer is approximately 2/1 to 1200/1.

Preferably, the inner layer 1 and the middle layer 2 which constitute the liquid storage member 10 of the present invention, are arranged spirally so that their adjacent portions come in contact but are not overlapped with each other along the lengthwise direction of the liquid storage member 10. Even though the adjacent portions are overlapped at the contact portion of the paper base laminates, that is, seam 4, the width of the overlap should be at most 1 mm. When one seam 4 is in contact with the other seam 4 so as not to be overlapped with each other, or when the overlapped width is at most 1 mm, liquid leakage from the seam 4 is suppressed. When the overlapped width at the seam 4 is larger than 1 mm, the level difference at the overlapped portion may cause liquid leakage.

The paper base material is spirally wound around the outer peripheral side of the middle layer 2 and forms the outer layer 3.

The paper base materials constituting the above inner layer 1 can be used as the paper base material constituting the outer layer 3 as needed.

As with the paper base laminates, the outer layer 3 is preferably wound so that its adjacent portions come into contact with each other. A seam 4' of the outer layer 3 and a seam 4 of the paper base laminate are preferably spaced by 1 mm or more, and spaced by a half or less of the width of the paper base laminate or the outer layer 3 along the lengthwise direction of the liquid storage member for coating tools. The seam 4' and the seam 4 are more preferably spaced by 3 mm or more, and spaced by a half or less of the width of the paper base laminate or the outer layer 3. Even though the seams 4' of the outer layer 3 are slightly overlapped, there is no trouble of liquid leakage.

As described above, the liquid storage member 10 of the present invention has the inner layer 1 and the middle layer 2, which correspond to the paper base laminate as a laminated composite material in which a metal layer or a silica deposition layer is formed on the surface of the paper base material, and the outer layer 3 made of the paper base material. Since no plastic layers are included, the liquid storage member for coating tools of the present invention is an environment-friendly product.

Figure 1B:
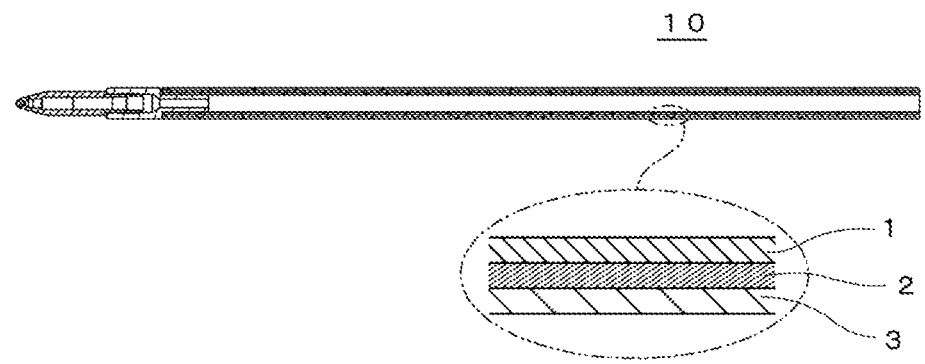
Figure 2:
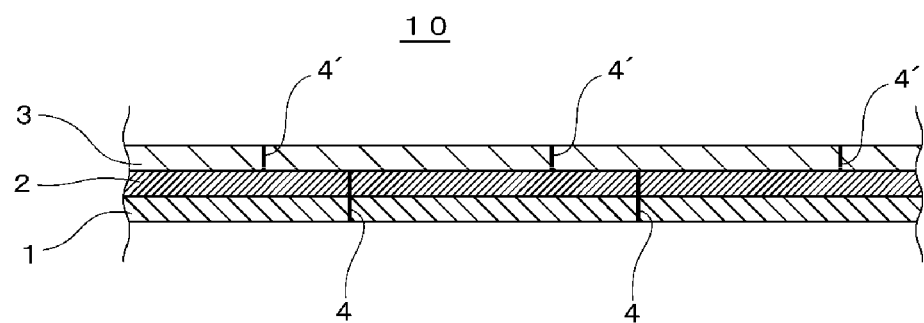
FIG. 2 shows three-layer structure of an inner layer, a middle layer and an outer layer constituting the liquid storage member for coating tools of the present invention.

As shown in FIGS. 1 and 2, an embodiment of the liquid storage member 10 of the present invention has the inner layer 1 made of the paper base material, the middle layer 2 which is the metal layer or the silica deposition layer, and the outer layer 3 made of the paper base material. The thickness ratio of the inner layer 1, the middle layer 2 and the outer layer 3 is usually 20 to 60:0.025 to 12:50 to 200, and preferably 20 to 30:0.025 to 12:50 to 200.

Figure 3:
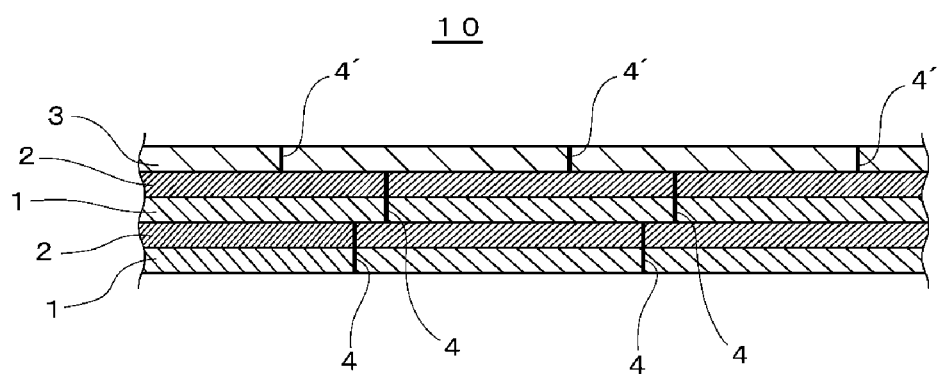
FIG. 3 shows five-layer structure of an inner layer, a middle layer, an inner layer, a middle layer, and an outer layer constituting the liquid storage member for coating tools of the present invention.

As shown in FIG. 3, the other embodiment of the liquid storage member 10 of the present invention has five-layer structure composed of the inner layer 1, the middle layer 2, the inner layer 1, the middle layer 2, and the outer layer 3. To be specific, the liquid storage member 10 of the present invention may include in this order another pair of the inner layer 1 and the middle layer 2 between the middle layer 2 and the outer layer 3 in three-layer structure composed of the inner layer 1, the middle layer 2, and the outer layer 3. In five-layer structure, the ratio of thickness (mm) for each of the inner layer 1, the middle layer 2 and the outer layer 3 may be the same as that of three-layer structure, and the thickness of two inner layers 1 and two middle layers 2 can be different, respectively. The other embodiment of the liquid storage member 10 described above is a preferred form, because leakage and volatilization of the liquid are prevented.

The liquid storage member 10 manufactured as described above is completed by pulling out the mandrel after the inner layer 1, the middle layer 2 and the outer layer 3 are formed, cutting a cylindrically formed body having three-layer or five-layer structure to have a certain length necessary for the liquid storage member 10 for coating tools, and drying it for a few hours under conditions of moderate temperature and humidity.

The liquid storage member 10 of the present invention is smaller in diameter than normal paper tubes. The outside diameter is usually 20 mm or less, preferably 15 mm or less, and more preferably 10 mm or less. The lower limit of the outside diameter is usually 1 mm or more and preferably 20 mm or more. The liquid storage members of such a small diameter demand strict dimension accuracy. As the outside diameter of the liquid storage member 10 becomes smaller, it is preferable that the paper base laminate should be arranged for the adjacent portions to come into contact but not to be overlapped with each other, and that the outer layer made of the paper base material should be arranged for the adjacent portions to come into contact with each other, when the paper base laminate and the outer layer made of the paper base material are wound spirally.

The liquid storage member 10 usually has a thickness of 0.07 to 0.6 mm, to be specific, 0.2 to 0.4 mm. In the above range of thickness, the liquid storage member 10 can hold a substantial amount of liquid, and can improve barrier properties and avoid the liquid spill and deterioration easily.

The liquid storage member 10 has some limitations in size, because it is loaded into a coating tool. The widest cross section is 1 to 20 mm, to be specific, 3 to 10 mm.

The coating tool of the present invention is not restricted only if equipped with the liquid storage member 10. The coating tool may be available for both a wadding-type and a direct liquid-type writing tools, and also may be appropriate for cosmetic tools, such as eyeliner, mascara and concealers.

As far as a writing tool is concerned, the nib may include a brush, a soft brush and a pen of any kind. To be more specific, the writing tool includes a fountain pen, a ballpoint pen, a marking pen, a felt pen, and a brush pen. The ink put into the liquid storage member 10 may be either a water-based (gel) ink or an oil-based ink. Considering the uses of pens, inks for ballpoint pens, pressurized ballpoint pens, and marking pens are included.

When the coating tool is a writing tool and the liquid storage member 10 is a paper refill for a writing tool, the present invention exerts favorable and meaningful effects.

EXAMPLES

Example 1

[Manufacture of the Liquid Storage Member for Coating Tools]

Glassine paper having a thickness of 25 μm (basis weight: 25 g/m$^2$ and density: 1.0 g/cm$^3$) was stuck on a 6.5 μm-thick aluminum foil with an acrylic adhesive to produce pasted paper. The pasted paper including the 6.5 μm-thick adhesive layer had a total thickness of 38 μm. The pasted paper was cut to a width of 11 mm with a bobbin slitter machine.

To the aluminum foil side of the outer layer of the band-shaped pasted paper, 35 g/m$^2$ of an acrylic adhesive was applied, and the obtained product was spirally wound around the peripheral side of the mandrel of a paper tube manufacturing machine (Langston) so as to make a single layer having the glassine paper inside.

Next, 66 μm-thick coated paper (basis weight: 85 g/m$^2$) was spirally wound around the aluminum foil side of the outer layer of the pasted paper to make a single layer.

It should be noted that each of the pasted paper and the coated paper was wound so as to butt each other at the adjacent portion in a manner not to be overlapped with. The contact portion between the pasted papers and the contact portion between the coated papers were arranged apart from each other by 3 mm along the lengthwise direction.

The spiral tube thus obtained was cut in a length of 89.3 mm to give a liquid storage member with an inner diameter of 3.8 mm for coating tools. The above liquid storage member was expressed as a paper tube 1.

[Evaluation of the Liquid Storage Member for Coating Tools]

(1) Measurement of Volatile Loss

The obtained paper tube 1 was filled with 0.7 g of a coating liquid 1 prepared as prescribed below, and then filled with polybutene to a length of approximately 10 mm to seal the rear end of the coating liquid.

| <Coating liquid 1> | (Total amount: 100 wt %) |
|---|---|
| Spiron Violet C-RH (manufactured by Hodogaya Chemical Co., Ltd.) | 8% |
| Spiron Yellow C-GNH (manufactured by Hodogaya Chemical Co., Ltd.) | 5% |
| Printex #35 (Degussa Japan Co., Ltd.) | 8% |
| Polyvinyl Butyral BL-1 (Sekisui Chemical Co., Ltd.) | 4% |
| Polyvinyl Butyral BH-3 (Sekisui Chemical Co., Ltd.) | 0.7% |
| Hilac 110H (Manufactured by Hitachi Chemical Co., Ltd.) | 10% |
| Solsperse 28000 (Manufactured by The Lubrizol Corporation) (acid value: 29, weight-average molecular weight: ca. 3400) | 1% |
| benzotriazole | 0.5% |
| 3-methoxy-3-methyl-1-butanol | 62.8% |

Next, a stainless steel stopper was press-fitted into the end part which was opposite to the sealing part of the liquid storage member. The paper tube 1 with both ends closed was left to stand horizontally for 10 days in an environment of 10% relative humidity (RH) at 50° C. The volatile loss (%) was obtained from the reduction amount of the coating liquid.

The volatile loss of the paper tube 1 was 0.63%.

(2) Bending Test

A wedge-type bending jig was pressed to the center of paper tube 1 under the condition of an inter-fulcrum distance of 75 mm. The value determined at buckling was regarded as the bending strength.

The bending strength of the paper tube 1 was 1.4 N.

Measurement results of the volatile loss and the bending test were shown in Table 1.

Examples 2 to 4

[Manufactures of the Liquid Storage Members for Coating Tools]

Liquid storage members for coating tools were manufactured in a manner similar to Example 1, except that the band-shaped pasted papers were spirally wound around the outer peripheral side of the mandrel of the paper tube manufacturing machine (Langston) in a double layer, not in a single layer. Those liquid storage members were expressed as paper tubes 2 to 4.

[Evaluation of the Liquid Storage Members for Coating Tools]

The volatile loss and the bending strength were measured in a manner similar to Example 1, except that the paper tube 3 was filled with coating liquid 2 and the paper tube 4 with coating liquid 3, instead of coating liquid 1. Coating liquids 2 and 3 were prepared as prescribed below. The paper tube 2 was filled with the coating liquid 1.

| <Coating liquid 2> | (Total amount: 100 wt %) |
|---|---|
| Fuji Red 2510 (manufactured by Fuji Pigment Co., Ltd.) | 8% |
| Joncryl 61J [BASF Japan Ltd.] | 6% |
| xanthan gum Kelsan S [Sansho Co., Ltd.] | 0.32% |
| isopropyl phosphate | 0.5% |
| Bioden 421 [Nippon Soda CO., LTD.] | 0.2% |
| benzotriazole | 0.3% |
| triethanolamine | 1.4% |
| propylene glycol | 15% |
| ion exchanged water | 68.28% |

| <Coating liquid 3> | | (Total amount: 100 wt %) |
|---|---|---|
| Vinyblan GV5651 [Nissin Chemical Industry Co., Ltd.] (poly(vinyl acetate) emulsion; solid content 40%) | | 80% |
| Acid dye | Red No. 227 | 0.22% |
| | Yellow No. 4 | 0.34% |
| | Blue No. 1 | 0.08% |
| Purified water | | 19.36% |

The paper tube 2 had a volatile loss of 0.51% and a bending strength of 2.1 N. The paper tube 3 had a volatile loss of 5.5% and a bending strength of 2.1 N. The paper tube 4 had a volatile loss of 5.3% and a bending strength of 2.1 N.

The results were shown in Table 1.

Example 5

[Manufacture of the Liquid Storage Member for Coating Tools]

A liquid storage member for coating tools was manufactured in a manner similar to Example 2, except that pasted paper prepared by sticking a parchment paper (basis weight: 25 g/m² and density: 1.0 g/cm³) on a 6.5 μm-thick aluminum foil was used instead of glassine paper. The liquid storage member was expressed as a paper tube 5.

[Evaluation of the Liquid Storage Member for Coating Tools]

The volatile loss and the bending strength were measured in a similar manner to Example 1. The paper tube 5 had a volatile loss of 0.53% and a bending strength of 1.9 N.

The results were shown in Table 1.

Example 6

[Manufacture of the Liquid Storage Member for Coating Tools]

A liquid storage member for coating tools was manufactured in a manner similar to Example 2, except that pasted paper having a 0.4 μm-thick silica deposition layer, not aluminum foil, on a 25 μm-thick glassine paper (basis weight: 25 g/m² and density: 1.0 g/cm³) was used. The liquid storage member was expressed as a paper tube 6.

[Evaluation of the Liquid Storage Member for Coating Tools]

The volatile loss and the bending strength were measured in a similar manner to Example 1. The paper tube 6 had a volatile loss of 0.51% and a bending strength of 2 N.

The results were shown in Table 1.

Example 7

[Manufacture of the Liquid Storage Member for Coating Tools]

A liquid storage member for coating tools was manufactured in a manner similar to Example 2, except that the coated paper was wound so as to have an overlapped portion of 1 mm, instead of being butted on each other at the adjacent portion. The liquid storage member was expressed as a paper tube 7.

[Evaluation of the Liquid Storage Member for Coating Tools]

The volatile loss and the bending strength were measured in a similar manner to Example 1. The paper tube 7 had a volatile loss of 0.53% and a bending strength of 2 N.

The results were shown in Table 1.

Example 8

[Manufacture of the Liquid Storage Member for Coating Tools]

A liquid storage member for coating tools was manufactured in a manner similar to Example 2, except that the contact portion between the pasted papers and the contact portion between the coated papers were arranged apart from each other not by 3 mm but by 5 mm. The liquid storage member was expressed as a paper tube 8.

[Evaluation of the Liquid Storage Member for Coating Tools]

The volatile loss and the bending strength were measured in a similar manner to Example 1. The paper tube 8 had a volatile loss of 0.52% and a bending strength of 2.1 N.

The results were shown in Table 1.

Comparative Example 1

[Manufacture of the Liquid Storage Member for Coating Tools]

A liquid storage member for coating tools was manufactured in a manner similar to Example 2, except that instead of the pasted paper, a product prepared by applying 35 g/m² of an acrylic adhesive to a lubricant-coated 6.5 μm-thick aluminum foil was spirally wound around the outer peripheral side of the mandrel of the paper tube manufacturing machine (Langston). In other words, in Comparative Example 1, the liquid storage member having no inner layer was manufactured. The liquid storage member was expressed as a paper tube 9.

[Evaluation of the Liquid Storage Member for Coating Tools]

The volatile loss and the bending strength were measured in a similar manner to Example 1.

Since the coating liquid exuded from the paper tube 9, the measurement of volatile loss was meaningless. The bending strength was 1.9 N.

The results were shown in Table 1.

Comparative Example 2

[Manufacture of the Liquid Storage Member for Coating Tools]

A liquid storage member for coating tools was manufactured in a manner similar to Example 2, except that instead of the pasted paper, a product prepared by applying 35 g/m² of an acrylic adhesive to 25 μm-thick glassine paper (basis weight: 25 g/m² and density: 1.0 g/cm³) was spirally wound around the outer peripheral side of the mandrel of the paper tube manufacturing machine (Langston). In other words, in Comparative Example 2, the liquid storage member having no middle layer was manufactured. The liquid storage member was expressed as a paper tube 10.

[Evaluation of the Liquid Storage Member for Coating Tools]

The volatile loss and the bending strength were measured in a similar manner to Example 1.

Since the coating liquid exuded from the paper tube 10, the measurement of volatile loss was meaningless. The bending strength was 1.9 N.

The results were shown in Table 1.

TABLE 1

|  | Ex. 1 | Ex. 2 | Ex. 3 | Ex. 4 | Ex. 5 | Ex. 6 | Ex. 7 | Ex. 8 | Comp. Ex. 1 | Comp. Ex. 2 |
|---|---|---|---|---|---|---|---|---|---|---|
| Paper Tube | 1 | 2 | 3 | 4 | 5 | 6 | 7 | 8 | 9 | 10 |
| Coating Liquid | 1 | 1 | 2 | 3 | 1 | 1 | 1 | 1 | 1 | 1 |

TABLE 1-continued

|  | Ex. 1 | Ex. 2 | Ex. 3 | Ex. 4 | Ex. 5 | Ex. 6 | Ex. 7 | Ex. 8 | Comp. Ex. 1 | Comp. Ex. 2 |
|---|---|---|---|---|---|---|---|---|---|---|
| Volatile Loss (%) | 0.63 | 0.51 | 5.5 | 5.3 | 0.53 | 0.51 | 0.53 | 0.52 | — | — |
| Bending Strength (N) | 1.4 | 2.1 | 2.1 | 2.1 | 1.9 | 2 | 2 | 2.1 | 1.9 | 1.9 |

REFERENCE SIGNS LIST

10 liquid storage member for coating tools
1 inner layer
2 middle layer
3 outer layer
4,4' seam

The invention claimed is:

1. A liquid storage member for coating tools having at least three layers of:
   a paper base laminate composed of an inner layer made of paper base material, and a middle layer of a metal layer or a silica deposition layer, formed on the outer peripheral side of the inner layer, and
   an outer layer made of the paper base material formed on the outer peripheral side of the middle layer,
   wherein the paper base material of the inner layer has a density of 0.8 g/cm³ or more.

2. The liquid storage member for coating tools according to claim 1, wherein the paper base material of the inner layer is glassine paper, parchment paper, or vulcanized fiber.

3. The liquid storage member for coating tools according to claim 1, having structures in which
   the paper base laminate is spirally wound, and
   the outer layer made of the paper base material is spirally wound around the outer peripheral side of the middle layer.

4. The liquid storage member for coating tools according to claim 3, having structures in which along the lengthwise direction of the liquid storage member for coating tools,
   the paper base laminate is spirally arranged for the adjacent portions to come into contact but not to be overlapped with each other, and
   the outer layer made of the paper base material is spirally arranged for the adjacent portions to come into contact with each other.

5. The liquid storage member for coating tools according to claim 1, having two or more of the paper base laminates.

6. The liquid storage member for coating tools according to claim 3, wherein the contact portion between the paper base laminates and the contact portion between the outer layers made of the paper base material are arranged apart from each other by 1 mm or more and a half or less of the width of the paper base laminate or the outer layer made of the paper base material along the lengthwise direction of the liquid storage member for coating tools.

7. The liquid storage member for coating tools according to claim 1, being a paper refill for a writing tool.

* * * * *